United States Patent
Kamruzzaman et al.

(10) Patent No.: US 10,767,625 B2
(45) Date of Patent: Sep. 8, 2020

(54) WIND TURBINE ROTOR BLADE

(71) Applicant: Wobben Properties GmbH, Aurich (DE)

(72) Inventors: Mohammad Kamruzzaman, Southampton (GB); Christian Frank Napierala, Aurich (DE); Heiner Sweers, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/330,983

(22) PCT Filed: Sep. 6, 2017

(86) PCT No.: PCT/EP2017/072301
§ 371 (c)(1),
(2) Date: Mar. 6, 2019

(87) PCT Pub. No.: WO2018/046519
PCT Pub. Date: Mar. 15, 2018

(65) Prior Publication Data
US 2019/0211799 A1 Jul. 11, 2019

(30) Foreign Application Priority Data
Sep. 9, 2016 (DE) .......... 10 2016 117 012

(51) Int. Cl.
*F03D 1/06* (2006.01)

(52) U.S. Cl.
CPC ......... *F03D 1/0675* (2013.01); *F03D 1/0633* (2013.01); *F05B 2240/30* (2013.01); *F05B 2260/96* (2013.01); *Y02E 10/721* (2013.01)

(58) Field of Classification Search
None
See application file for complete search history.

(56) References Cited

U.S. PATENT DOCUMENTS

| | | | |
|---|---|---|---|
| 8,419,373 B1 * | 4/2013 | Fukami | F03D 1/0633 415/4.3 |
| 8,602,732 B2 | 12/2013 | Wilson | |
| 9,897,070 B2 | 2/2018 | Hoffmann et al. | |
| 2009/0097976 A1 * | 4/2009 | Driver | F03D 7/022 416/42 |
| 2009/0263252 A1 * | 10/2009 | Slot | F03D 1/0641 416/223 R |

(Continued)

FOREIGN PATENT DOCUMENTS

| CN | 103032261 A | 4/2013 |
|---|---|---|
| CN | 104179642 A | 12/2014 |

(Continued)

*Primary Examiner* — Michael Lebentritt
(74) *Attorney, Agent, or Firm* — Seed Intellectual Property Law Group LLP

(57) ABSTRACT

A wind turbine rotor blade including a suction side, a pressure side, a blunt trailing edge, and a trailing edge enlargement unit arranged at the blunt trailing edge and has at least two stages. The trailing edge enlargement unit has a first portion and a second portion, where a transition from the blunt trailing edge to the first portion is substantially non-perpendicular and a transition between the first and second portions is also non-perpendicular.

3 Claims, 6 Drawing Sheets

(56) References Cited

U.S. PATENT DOCUMENTS

| | | | | |
|---|---|---|---|---|
| 2009/0290982 A1* | 11/2009 | Madsen | F03D 1/0633 | 416/61 |
| 2011/0135477 A1* | 6/2011 | Mohammed | F03D 7/0232 | 416/91 |
| 2012/0141281 A1* | 6/2012 | Carroll | F03D 1/0641 | 416/219 A |
| 2013/0129519 A1* | 5/2013 | Nielsen | F03D 13/10 | 416/228 |
| 2013/0323070 A1* | 12/2013 | Grabau | F03D 1/0675 | 416/229 R |
| 2014/0227101 A1* | 8/2014 | Yao | F03D 1/0608 | 416/236 R |
| 2014/0271213 A1* | 9/2014 | Yarbrough | F03D 3/061 | 416/223 R |
| 2014/0301864 A1* | 10/2014 | Singh | F03D 80/00 | 416/90 R |
| 2015/0050154 A1* | 2/2015 | Dixon | F01D 25/04 | 416/223 A |
| 2015/0078910 A1* | 3/2015 | Oerlemans | F03D 1/0675 | 416/228 |
| 2015/0139810 A1* | 5/2015 | Kinzie | F03D 1/0675 | 416/213 R |
| 2015/0176563 A1* | 6/2015 | Grasso | F03D 1/0633 | 416/147 |
| 2015/0198141 A1* | 7/2015 | Hayden | F01D 5/3092 | 416/1 |
| 2015/0266249 A1* | 9/2015 | Booth | F03D 1/0683 | 416/229 R |
| 2016/0047357 A1* | 2/2016 | Erbsloh | F03D 1/0675 | 416/244 R |
| 2016/0177922 A1* | 6/2016 | Zamora Rodriguez | F03D 7/0296 | 416/37 |
| 2017/0241400 A1* | 8/2017 | Whitehouse | F03D 1/0641 | |
| 2017/0284366 A1* | 10/2017 | Spitzner | F03D 7/022 | |
| 2018/0238298 A1* | 8/2018 | Grasso | F03D 7/024 | |
| 2019/0032631 A1* | 1/2019 | Hoffmann | F03D 1/0641 | |
| 2019/0353142 A1* | 11/2019 | Arce | F03D 7/0296 | |

FOREIGN PATENT DOCUMENTS

| | | |
|---|---|---|
| DE | 19614420 A1 | 10/1997 |
| DE | 102011012965 A1 | 9/2012 |
| DE | 102014203442 A1 | 5/2015 |
| DE | 202016101461 U1 | 5/2016 |
| EP | 1112928 A2 | 7/2001 |
| EP | 2806156 A1 | 11/2014 |
| EP | 2811156 A1 | 12/2014 |
| KR | 101498684 B1 | 3/2015 |
| RU | 141937 U1 | 6/2014 |
| RU | 2014127645 A | 1/2016 |
| WO | 2016/055076 A1 | 4/2016 |

\* cited by examiner

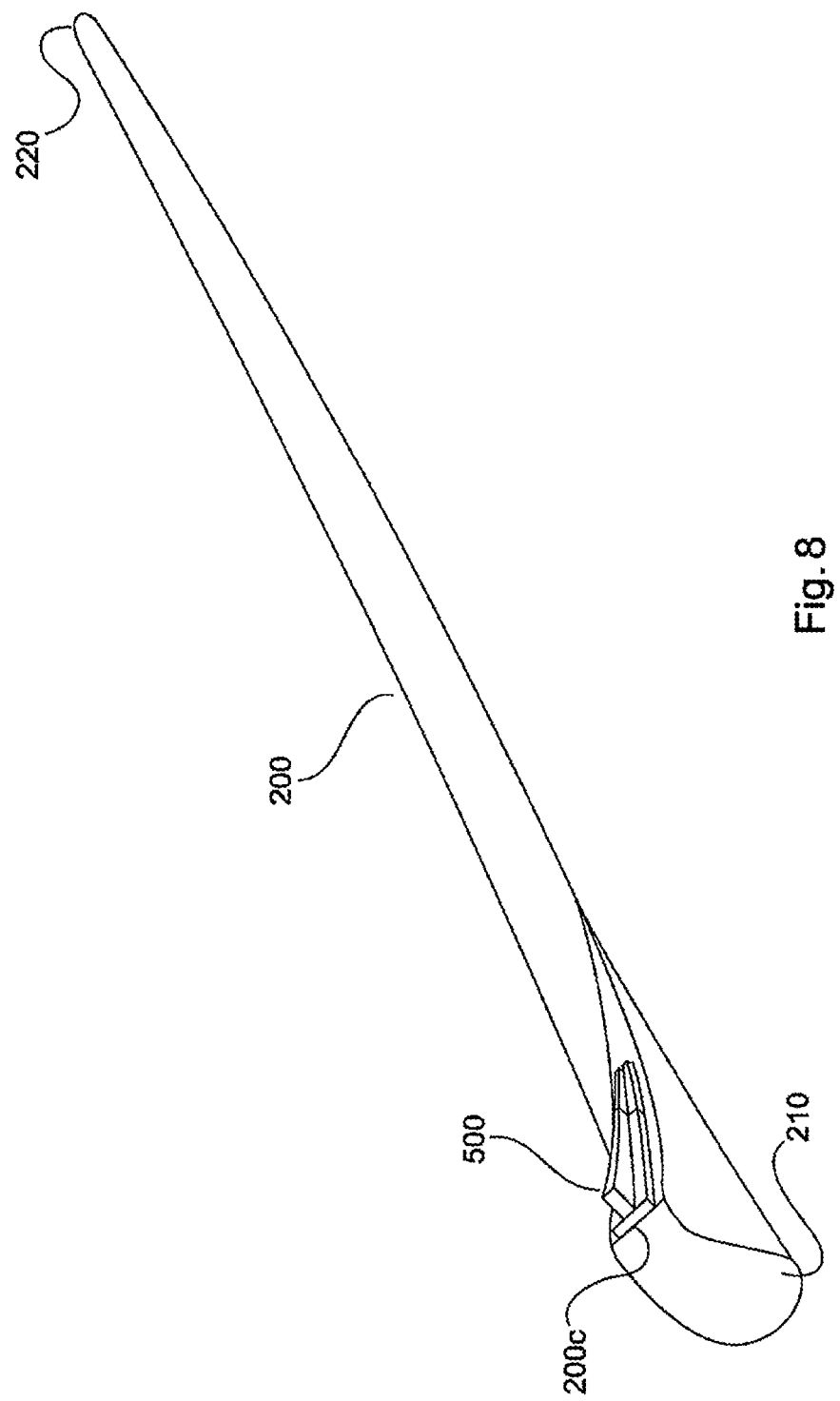

WIND TURBINE ROTOR BLADE

BACKGROUND

Technical Field

The present invention concerns a wind turbine rotor blade.

Description of the Related Art

Wind turbine rotor blades are known in various different configurations. For example, a rotor blade of a wind turbine can have a so-called flatback profile. In a flatback profile the suction side and the pressure side of the rotor blade no longer come together at the trailing edge but end at a spacing relative to each other, that is to say the trailing edge is blunt. Rotor blades of a wind turbine with a flatback profile are advantageous because the dimensions of the rotor blade are reduced thereby. That is particularly advantageous in regard to transportation of rotor blades. On the other hand, other problems, in particular aeroacoustic problems, arise due to a flatback profile. In the case of a rotor blade of a wind turbine with a flatback profile, a noise mechanism known as blunt trailing-edge vortex shedding can occur.

On the German patent application from which priority is claimed the German Patent and Trade Mark Office searched the following documents: DE 10 2011 012 965 A1, WO 2016/055 076 A1, DE 10 2014 203 442 A1, DE 20 2016 101 461 U1 and DE 196 14 420 A1.

BRIEF SUMMARY

Provided herein is a wind turbine rotor blade. Provided herein is a wind turbine rotor blade having a flatback profile which permits a reduction in noise emission.

Thus there is provided a wind turbine rotor blade comprising a suction side, a pressure side, a blunt trailing edge, and a trailing edge enlargement unit which is arranged at the blunt trailing edge and has at least two stages. The trailing edge enlargement unit has a first and a second portion, wherein a transition from the blunt trailing edge to the first portion is substantially non-perpendicular and a transition between the first and second portions is also non-perpendicular.

According to a further aspect of the invention the blunt trailing edge and the trailing edge enlargement unit are provided in a rotor blade root region of the rotor blade.

A wind turbine rotor blade having a flatback profile is provided. The trailing edge of the rotor blade is thus at least partially of a flat configuration. In addition the rotor blade has a stepped trailing edge enlargement.

Thus there is provided a wind turbine rotor blade having a suction side, a pressure side and a trailing edge which is at least partially in the form of a flatback profile so that the trailing edge is in the form of a blunt trailing edge. The thickness of the trailing edge is x % of a profile chord. The rotor blade further has a trailing edge enlargement which has at least 2 stages.

BRIEF DESCRIPTION OF THE SEVERAL VIEWS OF THE DRAWINGS

Advantages and embodiments by way of example of the invention are described in greater detail hereinafter with reference to the drawing.

FIG. 8 shows a diagrammatic view of a wind turbine rotor blade.

DETAILED DESCRIPTION

Figure 1:
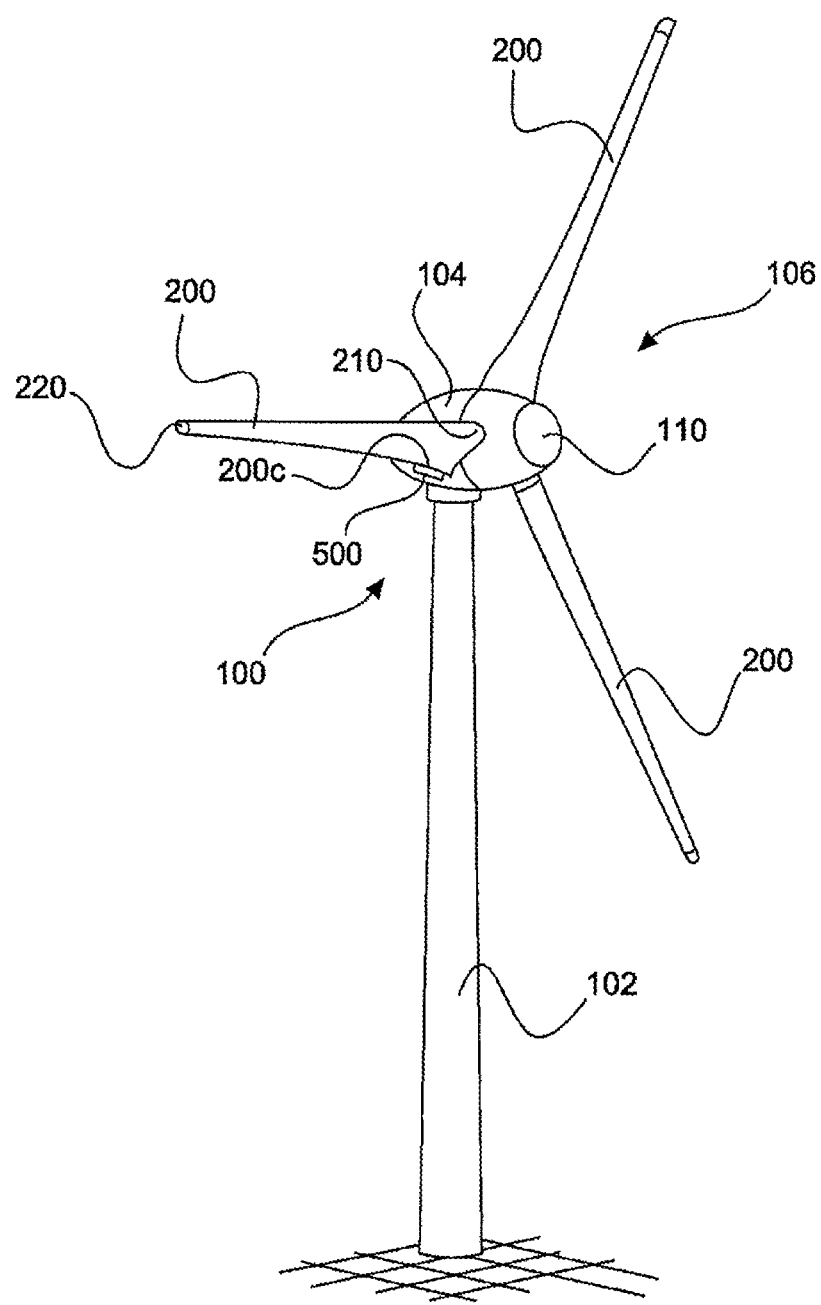
FIG. 1 shows a diagrammatic view of a wind turbine.

FIG. 1 shows a diagrammatic view of a wind turbine. The wind turbine 100 has a pylon 102 and a pod 104. A rotor 106 having three rotor blades 200 and a spinner 110 are arranged at the pod 104. The rotor 106 is caused to rotate by the wind in operation and thereby drives a generator in the pod 104 to generate electric power.

The rotor blade has a flatback profile, that is to say the rotor blade has a cut-off or blunt trailing edge 200c. A trailing edge enlargement unit 500 is provided in the region of the blunt trailing edge 200c.

Figure 2:
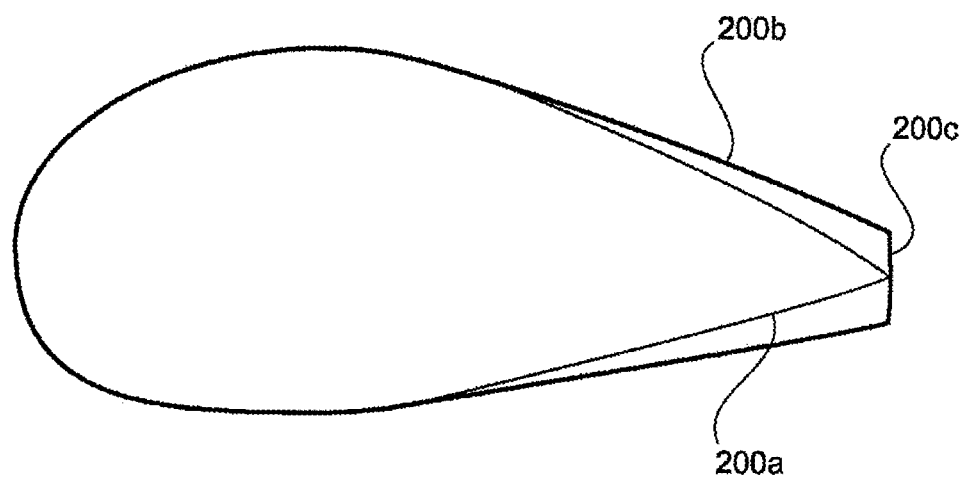
FIG. 2 shows a sectional view of two rotor blade profiles.

FIG. 2 shows a sectional view of two wind turbine profiles. FIG. 2 shows a profile 200a of a conventional rotor blade and a flatback profile 200b with a cut-off or blunt trailing edge 200c.

Figure 3:
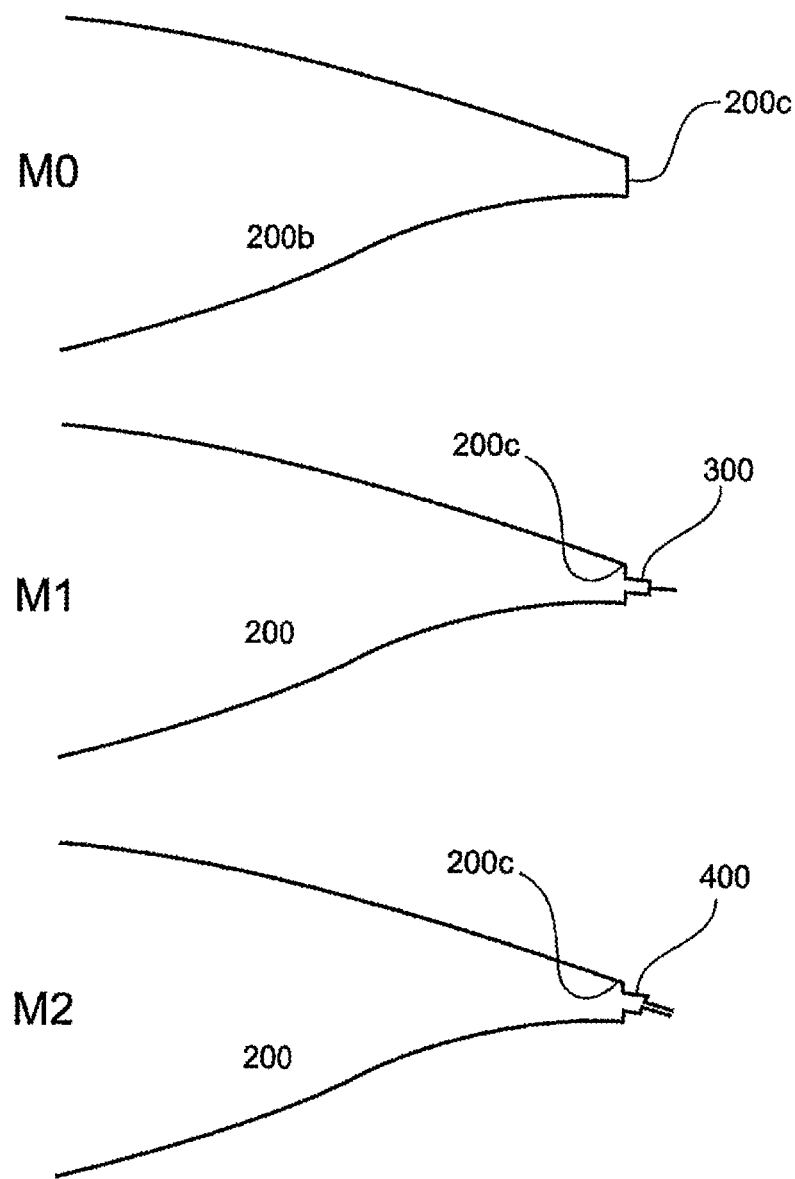
FIG. 3 shows a diagrammatic view of three different rotor blade profiles with a flatback profile.

FIG. 3 shows a diagrammatic view of three different wind turbine profiles, each having a cut-off trailing edge or a flatback profile. The first wind turbine profile M0 shows a standard flatback profile of a rotor blade. The second wind turbine rotor blade profile M1 shows a profile of a rotor blade of a wind turbine having a blunt trailing edge 200c and a trailing edge enlargement unit 300.

The third wind turbine rotor blade profile M2 has a flatback profile with a trailing edge enlargement 400 which is not perpendicular to the trailing edge.

Figure 4:
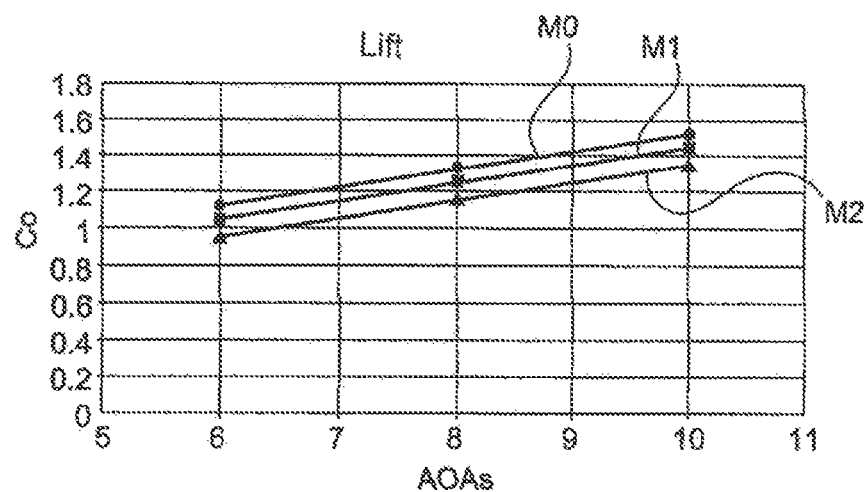
FIG. 4 shows a graph to illustrate the lift coefficient of the three wind turbine profiles of FIG. 3.
Figure 5:
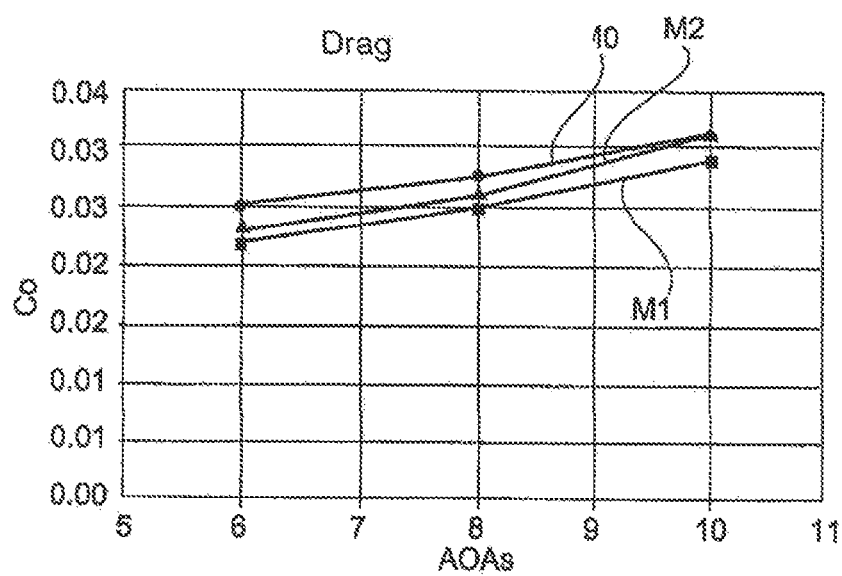
FIG. 5 shows a graph to illustrate the drag coefficient of the three wind turbine profiles of FIG. 3.
Figure 6:
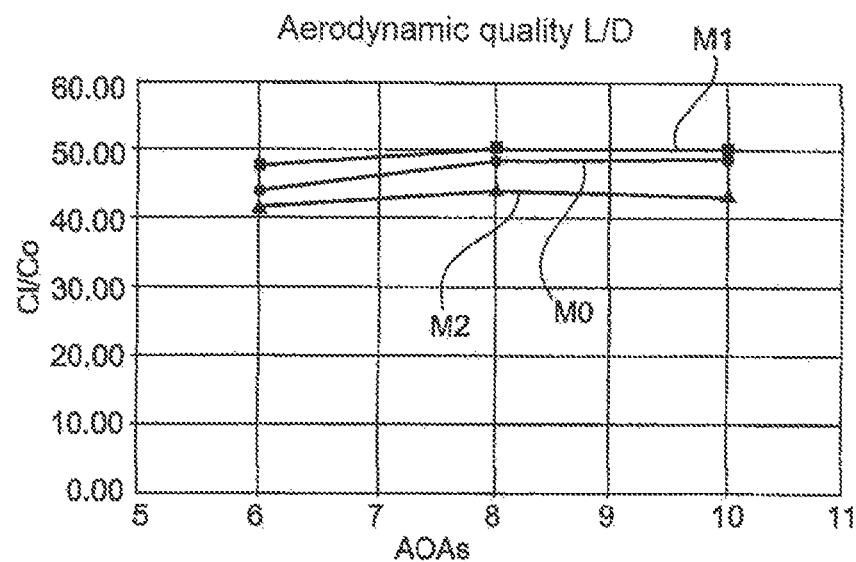
FIG. 6 shows a graph to illustrate the aerodynamic quality of the three wind turbine profiles of FIG. 3.

FIG. 4 shows the lift coefficient of the three rotor blade profiles, FIG. 5 shows the drag coefficient of the three rotor blade profiles and FIG. 6 shows the aerodynamic quality, that is to say the ratio of lift to drag of the three rotor blade profiles.

The configuration of the trailing edge enlargement can reduce an occurrence of a blunt trailing-edge vortex shedding so that a von-Karman vortex street is substantially avoided. The wind turbine rotor blade has a flatback profile in which the suction side and the pressure side of the rotor blade do not converge directly at the trailing edge. Rather, the trailing edge is of a desired thickness in comparison with the profile chord.

The provision of wind turbine rotor blades with flatback profiles leads to an improvement in terms of construction and/or manufacturing technology. If the flatback profile is used in particular in the hub region of the rotor blade that can result in a positive influence on aerodynamic quality. That can be explained by virtue of the fact that the boundary layer in the case of a classic profile of high relative thickness can break away prematurely by virtue of the steeper contour. A von-Karman vortex street can be avoided by the configuration according to the invention of the trailing edge or the trailing edge enlargement according to the invention.

The configuration of the trailing edge enlargement is also advantageous in regard to a so-called 'splitter plate' known from the state of the art at the trailing edge. The configuration of the trailing edge, in particular with the stepped trailing edge enlargement, can avoid cyclic vortex shedding phenomena. As can be seen from FIG. 5 the drag of the rotor blade profiles M1, M2 can be reduced in an angle of attack range of between 6 and 10°. In contrast thereto however the lift of the rotor blade profiles M1 and M2 is worsened in relation to the rotor blade profile M0.

The aerodynamic quality of the rotor blade profile M1 is better than the aerodynamic quality of the other two rotor blade profiles. In particular it is a striking point that the aerodynamic quality of the rotor blade profile M2 is worse than the other two. That can be attributed in particular to the inclined configuration of the trailing edge enlargement.

Figure 7:
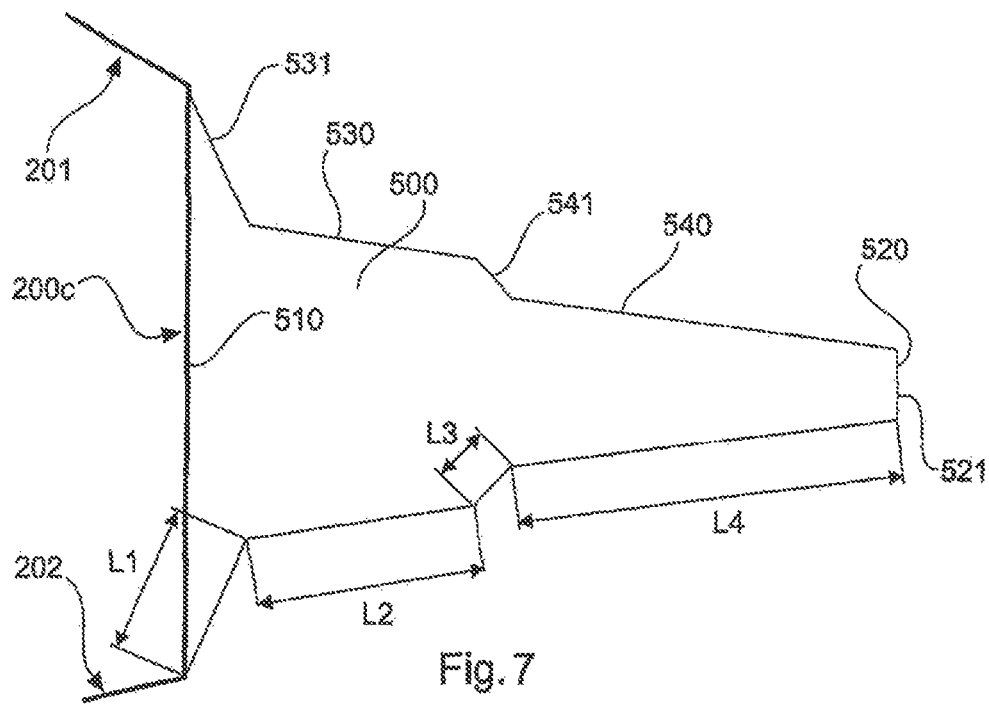
FIG. 7 shows a diagrammatic sectional view of a trailing edge of a wind turbine rotor blade.

FIG. 7 shows a diagrammatic sectional view of a trailing edge of a wind turbine rotor blade. The rotor blade has a suction side 201, a pressure side 202 and a blunt trailing edge 200c. The rotor blade also has a trailing edge enlargement 500. The trailing edge enlargement 500 has a first end 510 and a second end 520, as well as a first portion 530 and a second portion 540. The thickness of the first portion 530 is less than the thickness of the blunt trailing edge 200c. The thickness of the second portion 540 is less than the thickness of the first portion 530. Thus there is provided a trailing edge enlargement 500 having at least two stages. A first and second angle $\alpha_1$, $\alpha_2$ is provided in the transition between the blunt trailing edge and the first portion, and a third and a fourth angle $\alpha_3$, $\alpha_4$ can be provided in the transition between the first and second portions 530, 540.

In addition the trailing edge enlargement 500 can be described by four lengths $L_1$-$L_4$.

FIG. 8 shows a diagrammatic view of a wind turbine rotor blade. The wind turbine rotor blade 200 has a rotor blade root region 210 and a rotor blade tip region 220. In the region of the rotor blade root 210 the rotor blade has a blunt trailing edge 200c and a trailing edge enlargement unit 500. The configuration of the blunt trailing edge 200c and the trailing edge enlargement unit 500 can be as described above.

There is provided a wind turbine rotor blade which, in particular in the region of the rotor blade root 210, has a blunt trailing edge 200c and a trailing edge enlargement unit 500. The trailing edge enlargement unit can be arranged substantially perpendicularly to the blunt trailing edge and can optionally have a first and a second portion. The transition from the blunt trailing edge to the first portion can be perpendicular or non-perpendicular and a transition between the first and second portions can also be of a perpendicular or non-perpendicular configuration.

Use of a stepped trailing edge makes it possible to effectively prevent the shedding of cyclic vortices and thus eliminate a source of aeroacoustic noise.

The invention claimed is:

1. A wind turbine rotor blade, comprising:
   a suction side,
   a pressure side,
   a blunt trailing edge,
   a rotor blade root region,
   a rotor blade tip, and
   a trailing edge enlargement unit arranged at the blunt trailing edge and has at least two stages,
   wherein the trailing edge enlargement unit has a first end, a second end, a first portion and a second portion,
   wherein a transition from the blunt trailing edge to the first portion at the first end of the trailing edge enlargement unit is substantially non-perpendicular and a transition between the first and second portions is non-perpendicular,
   wherein the blunt trailing edge and the trailing edge enlargement unit are provided in the rotor blade root region, and
   wherein the second end of the trailing edge enlargement unit is blunt.

2. The wind turbine rotor blade as set forth in claim 1, wherein the trailing edge enlargement unit is arranged substantially perpendicularly to the blunt trailing edge.

3. A wind turbine, comprising:
   at least one wind turbine rotor blade including:
   a suction side,
   a pressure side,
   a blunt trailing edge,
   a rotor blade root region,
   a rotor blade tip, and
   a trailing edge enlargement unit arranged at the blunt trailing edge and has at least two stages,
   wherein the trailing edge enlargement unit has a first end, a second end, a first portion and a second portion,
   wherein a transition from the blunt trailing edge to the first portion at the first end of the trailing edge enlargement unit is substantially non-perpendicular and a transition between the first and second portions is non-perpendicular,
   wherein the blunt trailing edge and the trailing edge enlargement unit are provided in the rotor blade root region, and
   wherein the second end of the trailing edge enlargement unit is blunt.

* * * * *